(12) United States Patent
Tokumaru et al.

(10) Patent No.: US 7,707,440 B2
(45) Date of Patent: Apr. 27, 2010

(54) POWER SUPPLY UNIT FOR AN ELECTRONIC DEVICE SUCH AS AN ELECTRONIC DEVICE HAVING A TUNER

(75) Inventors: Hiroaki Tokumaru, Daito (JP);
 Atsuhiko Nagamune, Daito (JP);
 Yasuhiko Kawai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 749 days.

(21) Appl. No.: 11/698,194

(22) Filed: Jan. 26, 2007

(65) Prior Publication Data
 US 2007/0177320 A1 Aug. 2, 2007

(30) Foreign Application Priority Data
 Jan. 27, 2006 (JP) ............................. 2006-018403

(51) Int. Cl.
 *G06F 1/00* (2006.01)
(52) U.S. Cl. ...................................................... 713/300
(58) Field of Classification Search ................... 713/300

See application file for complete search history.

(56) References Cited

FOREIGN PATENT DOCUMENTS

| JP | 5-143202 A | 6/1993 |
|---|---|---|
| JP | 8-22335 A | 1/1996 |

*Primary Examiner*—Thomas Lee
*Assistant Examiner*—Mohammed H Rehman
(74) *Attorney, Agent, or Firm*—Crowell & Moring LLP

(57) ABSTRACT

A power supply unit for an electronic device comprises a three-terminal regulator in a high voltage connection line between a high voltage terminal of a DC power supply circuit and a microcomputer for reducing voltage from the high voltage terminal to a lower first voltage. A low voltage connection line between a low voltage terminal of the power supply circuit and the microcomputer is connected to the high voltage connection line at a connection point on output side of the regulator. In standby mode, voltage from the high voltage terminal, set higher than the first voltage, is reduced by the regulator to the first voltage and supplied to the microcomputer. In power-on mode, voltage from the low voltage terminal, set higher than the first voltage, is applied to the connection point so as to inactivate the regulator and supply the voltage from the low voltage terminal to the microcomputer.

7 Claims, 2 Drawing Sheets

POWER SUPPLY UNIT FOR AN ELECTRONIC DEVICE SUCH AS AN ELECTRONIC DEVICE HAVING A TUNER

BACKGROUND OF THE INVENTION

1. Field of the Invention

The present invention relates to a power supply unit for an electronic device such as an electronic device having a tuner.

2. Description of the Related Art

Generally, an electronic device such as a television receiver, to be connected to an AC power supply in use, is internally provided with a power supply unit such as a switching power supply to convert a voltage from the AC power supply to multiple different voltages for output. In the case of a television receiver, an internal switching power supply, for example, is provided to supply multiple kinds of voltages such as a relatively high voltage output (e.g. 33 volts) for operating a tuner and a relatively low voltage output (e.g. 7 volts) for operating a microcomputer. This will be described below with reference to FIG. 2.

FIG. 2 is a schematic block diagram of a conventional power supply unit Pc which is used for a television receiver as an electronic device. Referring to FIG. 2, the conventional power supply unit Pc, which has a DC power supply circuit 103 with multiple voltage output terminals, will be described. The power supply unit Pc comprises a microcomputer 107, a control circuit 106, a DC power supply circuit 103, an on/off controllable four-terminal regulator (high voltage) 108 and an on/off controllable four-terminal regulator (low voltage) 109 as well as regulators attached to the microcomputer 107, on/off controllers operated by the microcomputer 107, and diodes as shown. The DC power supply circuit 103 has two voltage output terminals, i.e. a high voltage terminal 101 for outputting a relatively high voltage V1 and a low voltage terminal 102 for outputting a relatively low voltage V2. The high voltage terminal 101 is connected via a diode to a television tuner 104 of a television receiver (not entirely shown), while the low voltage terminal 102 is connected via a diode to a small load circuit 105 (e.g. a lamp circuit of the television receiver). An AC power source is connected to the primary side of the DC power supply circuit 103.

The DC power supply circuit 103 is connected to the microcomputer 107 via the control circuit 106 which serves as a driver circuit. When a user switches the operation mode of the television receiver from normal power-on (power supply-on) mode to standby (power standby) mode, the microcomputer 107 outputs a voltage reduction command to the control circuit 106 so as to reduce the output voltages V1, V2 of the high voltage terminal 101 and low voltage terminal 102, respectively. Specifically, the output voltages V1 and V2 from the high voltage terminal 101 and low voltage terminal 102 are set to be 33 volts and 8 volts, respectively, when the television receiver is in the power-on mode. When the television receiver is switched to the standby mode, the output voltages from the high voltage terminal 101 and low voltage terminal 102 are reduced to 8 volts and 4 volts, respectively. The standby mode thus allows the power consumption to be significantly saved. Furthermore, the output from the high voltage terminal 101 is connected to the microcomputer 107 via the on/off controllable regulator 108, while the output from the low voltage terminal 102 is connected to the microcomputer 107 via the on/off controllable regulator 109.

For operating the microcomputer 107 in the power supply unit Pc, specifically, the voltage of a voltage supply point (point A) to the microcomputer 107 is to be at least 7 volts. In order to provide the voltage of the voltage supply point (point A), which is to be supplied to the regulators attached to the microcomputer 107, the output voltage from the regulator 108 connected to the high voltage terminal 101 and the output voltage from the regulator 109 connected to the low voltage terminal 102 are switched by controlling the on/off switching of the regulators 108, 109. Note that the regulators 108, 109 are four-terminal on/off controllable regulators, which, when turned on, reduce the voltages from the high voltage terminal 101 and low voltage terminal 102 to 7 volts (the same voltage) so as to output this voltage of 7 volts, and which, when turned off, stop output.

More specifically, when the operation mode of the television receiver is power-on mode, the regulator 108 is switched off while the regulator 109 is switched on, so as to reduce the voltage V2 (8 volts) from the low voltage terminal 102 to 7 volts, which is then supplied to the voltage supply point (point A) to supply the voltage (7 volts) to the regulators attached to the microcomputer 107. On the other hand, when the operation mode is standby mode, the regulator 108 is switched on while the regulator 109 is switched off, so as to reduce the voltage V1 (8 volts) from the high voltage terminal 101 to 7 volts, which is then supplied to the voltage supply point (point A) to supply the voltage (7 volts) to the regulators attached to the microcomputer 107. Thus, the conventional power supply unit Pc is advantageous in that regardless of the operation mode, the input voltage (8 volts) to the regulators 108, 109 is close to the output voltage (7 volts) from the regulators 108, 109, so that the heat loss in the regulators 108, 109 can be reduced. However, the conventional power supply unit Pc at the same time has problems as described below.

That is, there is a risk that there may be a moment when both regulators 108, 109 are in the off state because the timing of switching the regulator 108 on/off is not synchronized with the timing of switching the regulator 109 on/off at such moment. In this case, there is a risk that the supply voltages to the microcomputer 107 may become lower than a minimum required voltage, thereby causing a malfunction. Another problem is that it is required to install, in the microcomputer 107, a control program for the on/off control of the regulators 108, 109. At the same time, the microcomputer 107 is required to have ports for outputting on/off control signals to the regulators 108, 109. This makes it necessary to provide signal lines to be connected to these ports. This is also a problem because it reduces the degree of freedom in circuit design.

Technologies relating to power supply units in this field include those described below. For example, in the electronic device with a power supply unit as described above, a malfunction is caused when the timing of the voltage supply to the microcomputer is not synchronized with the timing of the voltage supply to circuits other than the microcomputer. In order to allow the timing of the voltage supply to the microcomputer to be accurately synchronized with the timing of the voltage supply to other circuits than the microcomputer, a known malfunction prevention device is designed such that multiple voltages output from a power supply unit are converted to the same voltage via a regulator, and are logically summed by a logic circuit, the output of which is input to the microcomputer (refer to e.g. Japanese Laid-open Patent Publication Hei 5-143202).

There is also a system consisting of a modem with a built-in single chip CPU (Central Processing Unit) connected to an external data communication terminal which supplies a voltage to the modem. The modem has a regulator circuit and a DC-DC converter circuit as well as a voltage determination circuit therein for selecting either the regulator circuit or the DC-DC converter circuit according to the kind of voltage supplied from the data communication terminal, so as to form a voltage conversion circuit to supply a predetermined voltage to the single chip CPU through selected one of the regulator circuit and the DC-DC converter circuit (refer to e.g. Japanese Laid-open Patent Publication Hei 8-22335). The technologies described in these patent documents, however, cannot solve the problems as described above.

SUMMARY OF THE INVENTION

An object of the present invention is to provide a power supply unit for an electronic device, such as an electronic device having a tuner, in which there is no risk that a supply voltage to a microcomputer becomes lower than a minimum required voltage even with a simple circuit configuration while at the same time there is no need for on/off control of a regulator, and in which it is unnecessary to provide the microcomputer with a port for outputting an on/off control signal to the regulator, thus making it possible to reduce the manufacturing cost.

According to the present invention, this object is achieved by a power supply unit for an electronic device to operate in one of operations modes including power-on mode and standby mode for power saving, the power supply unit comprising: a DC power supply circuit having two voltage output terminals for different output voltages, one of the voltage output terminals being for a higher output voltage (such voltage output terminal being hereafter referred to as "high voltage terminal") and the other being for a lower output voltage (such voltage output terminal being hereafter referred to as "low voltage terminal"), the DC power supply circuit being provided for reducing the output voltages from the high voltage terminal and low voltage terminal when the operation mode is switched from the power-on mode to the standby mode; a microcomputer connected to both the high voltage terminal and low voltage terminal of the DC power supply circuit for receiving a voltage supply from the high voltage terminal when the operation mode is the standby mode, and for receiving a voltage supply from the low voltage terminal when the operation mode is the power-on mode; and a first regulator inserted in a connection line between the high voltage terminal of the DC power supply circuit and the microcomputer (such connection line being hereafter referred to as "high voltage connection line") for reducing the output voltage from the high voltage terminal to a first voltage, which is thus lower than the output voltage from the high voltage terminal, in which a connection line between the lower voltage terminal of the DC power supply circuit and the microcomputer (such connection line being hereafter referred to as "low voltage connection line") is connected to the high voltage connection line at a connection point therebetween on the output side of the first regulator. When the operation mode is the standby mode, the output voltage from the high voltage terminal, which is set to be higher than the first voltage, is reduced by the first regulator to the first voltage, which is then supplied as a supply voltage to the microcomputer. When the operation mode is the power-on mode, the output voltage from the low voltage terminal, which is set to be higher than the first voltage, is applied to the connection point between the high voltage connection line and the low voltage connection line so as to inactivate the first regulator and supply the output voltage, as a supply voltage, from the low voltage terminal to the microcomputer.

Preferably, the first regulator is a three-terminal regulator.

Further preferably, the power supply unit further comprises a second regulator connected to a voltage supply port of the microcomputer for reducing the supply voltage from the high voltage terminal or the supply voltage from the low voltage terminal to a second voltage suitable for operating the microcomputer.

The power supply unit can be designed so that a first load including a tuner is connected to the high voltage terminal, while a second load, which can be driven by a voltage lower than that for driving the first load, is connected to the low voltage terminal.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Embodiments of the present invention, as best mode for carrying out the invention, will be described hereinafter with reference to the drawings. The present invention relates to a power supply unit for an electronic device such as an electronic device having a tuner. It is to be understood that the embodiments described herein are not intended as limiting, or encompassing the entire scope of, the present invention.

Figure 1:
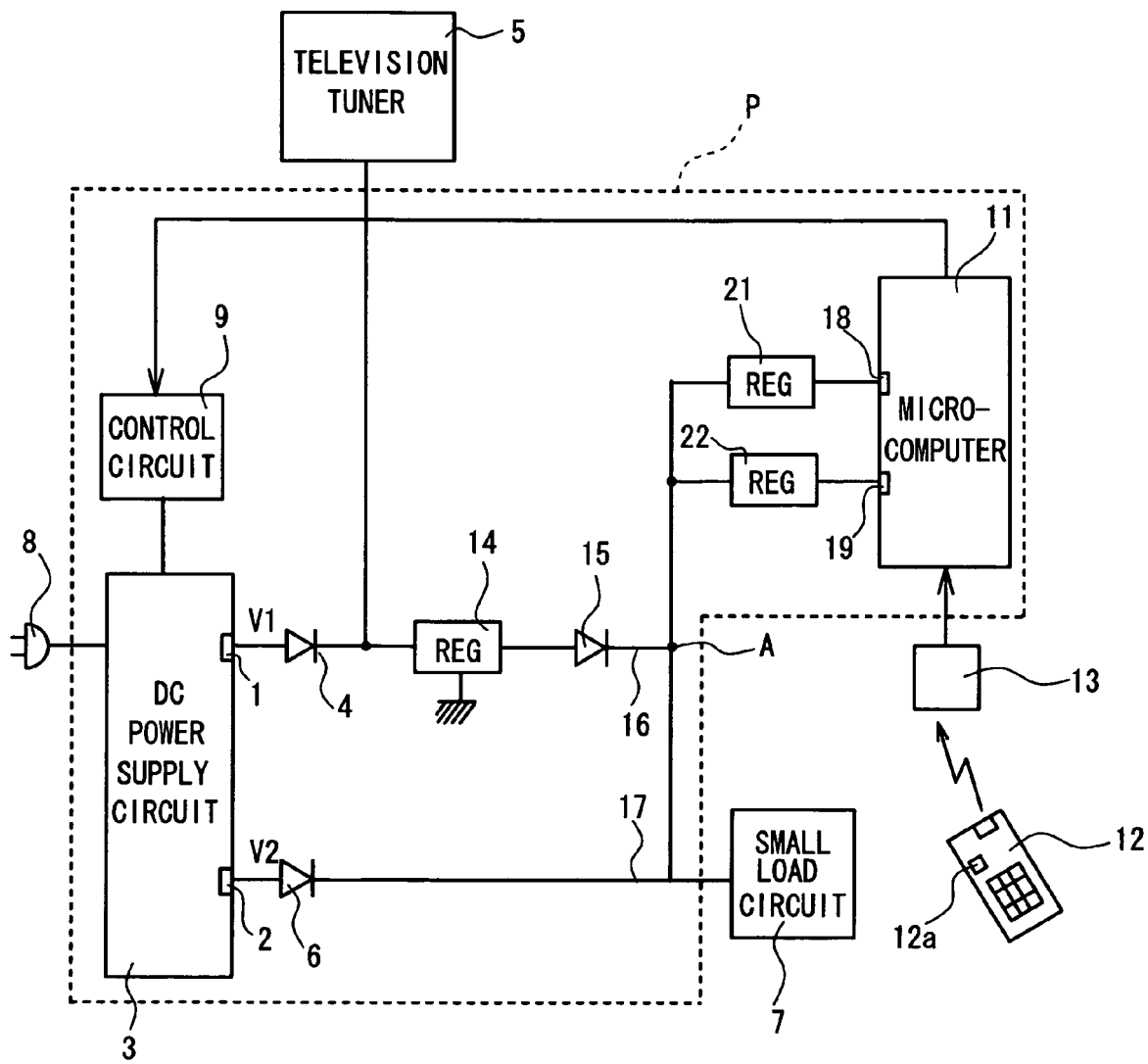
FIG. 1 is a schematic block diagram of a power supply unit according to an embodiment of the present invention which is used for a television receiver as an example of an electronic device.
Figure 2:
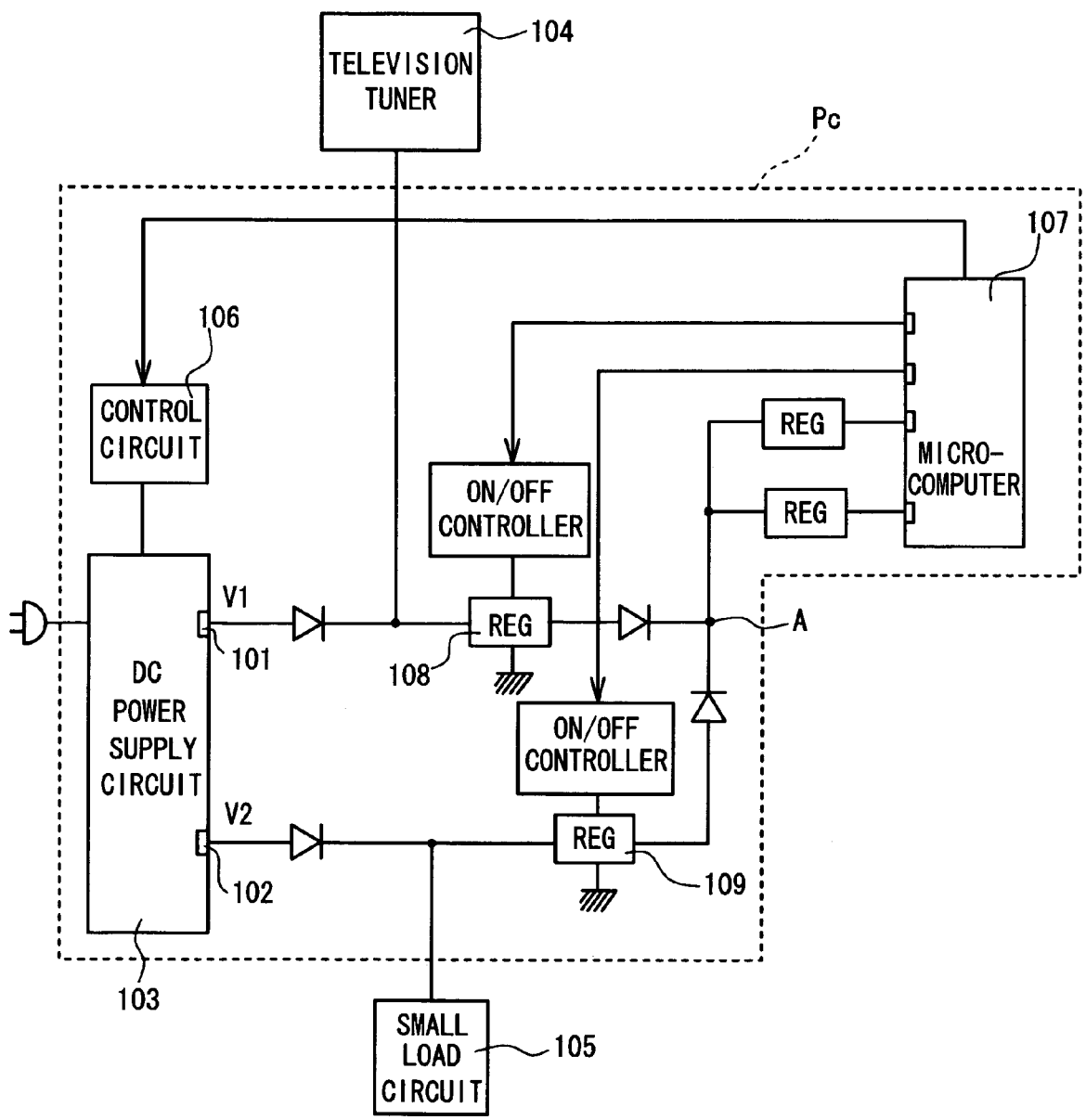
FIG. 2 is a schematic block diagram of a conventional power supply unit which is used for a television receiver as an electronic device.

FIG. 1 is a schematic block diagram of a power supply unit P according to an embodiment of the present invention which is used for a television receiver as an example of an electronic device. Referring to FIG. 1, the power supply unit P of the present embodiment for a television receiver will be described. The power supply unit P comprises a microcomputer 11, a control circuit 9, a DC power supply circuit 3, diodes 4, 6, a three-terminal (high voltage) regulator 14, a diode 15, connection lines 16, 17, and regulators 21, 22 (attached to the microcomputer 11). The DC power supply circuit 3 is formed of a switching power supply having two voltage output terminals, i.e. a high voltage terminal 1 for outputting a relatively high voltage V1 and a low voltage terminal 2 for outputting a relatively low voltage V2. The high voltage terminal 1 is connected via the diode 4 to a television tuner 5 (large load circuit: claimed "first load") of a television receiver (not entirely shown), while the low voltage terminal 2 is connected via the diode 6 to a small load circuit 7 (e.g. a lamp circuit of the television receiver: claimed "second load"), in which the small load circuit 7 can be driven by a voltage lower than that for driving the television tuner 5. An AC power source 8 is connected to the primary side of the DC power supply circuit 3.

The DC power supply circuit 3 is connected to the microcomputer 11 via the control circuit 9 which serves as a driver circuit. When a user switches the operation mode of the television receiver from normal power-on (power supply-on) mode to standby (power standby) mode, the microcomputer 11 outputs a voltage reduction command to the control circuit 9 so as to reduce the output voltages V1, V2 of the high voltage terminal 1 and low voltage terminal 2. More specifically, the user operates a remote control 12 to emit user commands using an infrared light to a photodetector 13 which is connected to the microcomputer 11, and which outputs the user commands received thereby to the microcomputer 11. Based on the user commands thus input to the microcomputer 11, the microcomputer 11 outputs command signals to various circuits including outputting a voltage reduction command signal to the control circuit 9. Note that the television tuner 5, small load circuit 7, remote control 12 and photodetector 13 are elements in the television receiver which is not entirely shown in FIG. 1.

For example, assume that the television receiver is in viewable mode (power-on mode). When a user then operates a power supply button 12a of the remote control 12 to stop viewing, the remote control 12 emits, to the photodetector 13, a power on/off command to be then input to the microcomputer 11. Based on the power on/off command, the microcomputer 11 outputs a voltage reduction command signal to the control circuit 9 so as to switch the television receiver to standby mode. When the user then operates the power supply button 12a of the remote control 12 again to resume viewing, the remote control 12 emits, to the photodetector 13, a power on/off command to be then input to the microcomputer 11. Based on the power on/off command, the microcomputer 11 outputs a voltage increase command signal to the control circuit 9 so as to switch the television receiver to the power-on mode again.

Specifically, the output voltages V1 and V2 from the high voltage terminal 1 and low voltage terminal 2 are set to be 33 volts and 8 volts, respectively, when the television receiver is in the power-on mode. When the television receiver is switched to the standby mode, the output voltages from the high voltage terminal 1 and low voltage terminal 2 are reduced to 8 volts and 4 volts, respectively. The standby mode thus allows the power consumption to be significantly saved.

The output voltage V1 from the high voltage terminal 1 is input to the microcomputer 11 via the three-terminal regulator 14 (claimed "first regulator": the output voltage from the three-terminal regulator 14 being claimed "first voltage") and the diode 15, while the output voltage V2 from the low voltage terminal 2 is input to the microcomputer 11, not via a regulator corresponding to the three-terminal regulator 14. The connection line (high voltage connection line) 16 between the three-terminal regulator 14 and the microcomputer 11 is connected, at a connection point A on the cathode side of the diode 15 or on the output side of the regulator 14, to the connection line (low voltage connection line) 17 between the low voltage terminal 2 and the microcomputer 11. This connection point A serves as a voltage supply point (point A) to the microcomputer 11.

The microcomputer 11 has voltage supply ports 18, 19 to which attached or connected are regulators 21, 22 (each being claimed "second regulator") for reducing the voltage supplied to the voltage supply point (point A) to a signal voltage and a VCC voltage (power supply voltage) for the microcomputer 11 (each of the signal voltage and the VCC voltage being claimed "second voltage" suitable for operating the microcomputer 11). Specifically, the output voltages from the regulators 21, 22 are set to be 1.5 volts and 3.3 volts, respectively. For operating the microcomputer 11 in the power supply unit P according to the present embodiment, specifically, the voltage of the voltage supply point (point A) to the microcomputer 11 is to be at least 7 volts, similarly as in the conventional power supply unit. In order to provide the voltage of the voltage supply point (point A), which is to be supplied to the regulators 21, 22, the output voltage from the regulator 14 connected to the high voltage terminal 1 and the output voltage from the low voltage terminal 2 are switched according to the switching of the operation mode of the television receiver between the standby mode and the power-on mode in a manner described below.

When the operation mode of the television receiver is switched by the user to the standby mode using the remote control 12, the voltage V1 (8 volts) from the high voltage terminal 1 is reduced by the three-terminal regulator 14 to 7 volts, which, as is, is applied to the voltage supply point (point A), the voltage of which is applied to the regulators 21, 22 attached to the microcomputer 11. At this time, the voltage V2 (4 volts) from the lower voltage terminal 2 is also applied to the voltage supply point (point A). On the other hand, when the operation mode of the television receiver is switched by the user to the power-on mode using the remote control 12, the voltage V2 (8 volts) from the low voltage terminal 2 is applied to the voltage supply point (point A). This voltage (8 volts) is reduced by the regulators 21, 22 to predetermined voltages (1.5 volts and 3.3 volts), which are then supplied to the voltage supply ports 18, 19 of the microcomputer 11, respectively.

At this time, there is no current flowing through the regulator 14 because the anode and cathode of the diode 15 are 7 volts and 8 volts, respectively, so that the voltage V1 (33 volts) from the high voltage terminal 1 is supplied only to the television tuner 5 without causing a current to flow to the microcomputer 11. Accordingly, regardless of the operation mode of the television receiver, an appropriate voltage is supplied to the voltage supply point (point A) to the microcomputer 11.

As described in the foregoing, the regulator 14 per se connected to the high voltage terminal 1 is a three-port regulator which cannot be controlled on and off. However, the power supply unit P supplies an appropriate voltage to the microcomputer 11 (regulators 21, 22) skillfully without the on/off control of the regulator 14. When the operation mode of the television receiver is the power-on mode, the regulator 14 is inactivated by the reverse potential difference between the output voltage (7 volts) of the regulator 14 and the output voltage (8 volts) of the low voltage terminal 2. In contrast, when the operation mode is the standby mode, the regulator 14 is activated because of the forward potential difference between the output voltage (7 volts) of the regulator 14 and the output voltage (4 volts) of the low voltage terminal 2.

Thus, the power supply source is switched between the high voltage terminal 1 and the low voltage terminal 2 at a timing accurately synchronized with the timing of the switching of the operation mode, thereby preventing a risk of malfunction that results e.g. from a reduction of the supply voltage or voltages to the microcomputer 11 below an appropriate voltage or voltages even in a very short time, which may occur when a regulator to be controlled on and off is used as in the prior art. In addition, the absence of need for the on/off control of the regulator 14 makes it unnecessary to install a control program for the on/off control in the microcomputer 11, or to provide the microcomputer 11 with a port for outputting an on/off control signal to the regulator 14, thereby increasing the degree of freedom in circuit design and reducing the manufacturing cost.

It is to be noted that the present invention is not limited to the above embodiments, and various modifications are possible within the spirit and scope of the present invention. For example, in the embodiments described above, the microcomputer 11 has two voltage supply ports 18, 19 to respectively receive voltages to operate the microcomputer 11 via the regulators 21, 22. However, depending on the circuit design of the microcomputer 11, the number of voltage supply ports as well as the number of the corresponding regulators can be any number, whether only one or even more than two. Generically describing, the microcomputer 11 is required to have at least one voltage supply port to receive a voltage, as a "second voltage", via corresponding at least one regulator to operate the microcomputer 11.

Furthermore, although specific voltages are described above as examples of the output voltage V1 of the high voltage terminal 1 in the standby mode and the output voltage V2 of the low voltage terminal 2 in the power-on mode, other voltages than the specific voltages can be used, if they are higher than the one voltage to be supplied to the one voltage supply port, or the two or more voltages to be supplied to the two or more voltage supply ports, of the microcomputer 11 depending on the circuit design of the microcomputer 11 as described in the preceding paragraph. In selecting the output voltage V1 of the high voltage terminal 1 in the standby mode and the output voltage V2 of the low voltage terminal 2 in the power-on mode, it is preferred that these voltages V1, V2 be selected to be as close as possible to an actual operation voltage of the microcomputer 11 in order to reduce heat loss in the regulators 21, 22 or in the at least one regulator described in the preceding paragraph.

In addition, although the power supply unit P in the embodiments described above is applied to a television receiver with a television tuner 5, as a large load circuit, connected to the high voltage terminal 1 of the power supply unit P, the present invention can be applied e.g. to a power supply unit to be applied to other electronic devices such as video cassette recorders and disc recorders, each with or without a tuner.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2006-018403 filed Jan. 27, 2006, the content of which is hereby incorporated by reference.

What is claimed is:

1. A power supply unit for an electronic device to operate in one of operations modes including power-on mode and standby mode for power saving, the power supply unit comprising:
a DC power supply circuit having two voltage output terminals for different output voltages, one of the voltage output terminals being for a higher output voltage and the other being for a lower output voltage, the DC power supply circuit being provided for reducing the output voltages from the high voltage terminal and low voltage terminal when the operation mode is switched from the power-on mode to the standby mode;
a microcomputer connected to both the high voltage terminal and low voltage terminal of the DC power supply circuit for receiving a voltage supply from the high voltage terminal when the operation mode is the standby mode, and for receiving a voltage supply from the low voltage terminal when the operation mode is the power-on mode; and
a first regulator inserted in a connection line between the high voltage terminal of the DC power supply circuit and the microcomputer for reducing the output voltage from the high voltage terminal to a first voltage, which is thus lower than the output voltage from the high voltage terminal, in which a connection line between the lower voltage terminal of the DC power supply circuit and the microcomputer is connected to the high voltage connection line at a connection point there between on the output side of the first regulator,
wherein when the operation mode is the standby mode, the output voltage from the high voltage terminal, which is set to be higher than the first voltage, is reduced by the first regulator to the first voltage, which is then supplied as a supply voltage to the microcomputer, and
wherein when the operation mode is the power-on mode, the output voltage from the low voltage terminal, which is set to be higher than the first voltage, is applied to the connection point between the high voltage connection line and the low voltage connection line so as to inactivate the first regulator and supply the output voltage from the low voltage terminal, as a supply voltage, to the microcomputer.

2. The power supply unit for an electronic device according to claim 1, wherein the first regulator is a three-terminal regulator.

3. The power supply unit for an electronic device according to claim 2, wherein a first load including a tuner is connected to the high voltage terminal, while a second load, which can be driven by a voltage lower than that for driving the first load, is connected to the low voltage terminal.

4. The power supply unit for an electronic device according to claim 3, which further comprises a second regulator connected to a voltage supply port of the microcomputer for reducing the supply voltage from the high voltage terminal or the supply voltage from the low voltage terminal to a second voltage suitable for operating the microcomputer.

5. The power supply unit for an electronic device according to claim 2, which further comprises a second regulator connected to a voltage supply port of the microcomputer for reducing the supply voltage from the high voltage terminal or the supply voltage from the low voltage terminal to a second voltage suitable for operating the microcomputer.

6. The power supply unit for an electronic device according to claim 1, which further comprises a second regulator connected to a voltage supply port of the microcomputer for reducing the supply voltage from the high voltage terminal or the supply voltage from the low voltage terminal to a second voltage suitable for operating the microcomputer.

7. The power supply unit for an electronic device according to claim 1, wherein a first load including a tuner is connected to the high voltage terminal, while a second load, which can be driven by a voltage lower than that for driving the first load, is connected to the low voltage terminal.

* * * * *